United States Patent [19]
Robertson et al.

[11] Patent Number: 6,105,923
[45] Date of Patent: *Aug. 22, 2000

[54] BELT CLIP APERTURE FOR USE IN A TWO-WAY RADIO HOUSING AND METHOD OF USING SAME

[75] Inventors: William H. Robertson, Plantation; Robert Leon, Miami; Sam Hosseini, Weston, all of Fla.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/888,807

[22] Filed: Jul. 7, 1997

[51] Int. Cl.[7] ........................................... F16M 11/00
[52] U.S. Cl. ..................... 248/682; 24/3.12; 224/257; 248/689; 248/316.7
[58] Field of Search ........................... 248/682, 690, 248/693, 207, 231.81, 911, 316.7; 224/269, 666, 904, 930, 257, 271, 255, 580; 455/351; 24/3.12

[56] References Cited

U.S. PATENT DOCUMENTS

| | | | |
|---|---|---|---|
| D. 209,673 | 12/1967 | Sunders, Jr. et al. | 455/351 X |
| 3,214,685 | 10/1965 | Brenner | 224/269 X |
| 3,843,032 | 10/1974 | Moran et al. | 224/255 X |
| 4,049,165 | 9/1977 | Goldhaft | 224/255 X |
| 4,450,495 | 5/1984 | Naruki | 224/930 X |
| 5,097,997 | 3/1992 | Kipnis et al. | 248/207 X |
| 5,159,712 | 10/1992 | Schneider et al. | 155/351 X |
| 5,195,264 | 3/1993 | Johanson et al. | 248/911 X |
| 5,210,532 | 5/1993 | Knoedler et al. | 224/269 X |
| 5,280,635 | 1/1994 | Knoedler et al. | 224/269 X |
| 5,297,318 | 3/1994 | Adophson et al. | 224/269 X |
| 5,398,855 | 3/1995 | Schaiewitz | 224/257 |
| 5,644,785 | 7/1997 | Garrett | 224/930 X |
| 5,653,336 | 8/1997 | Buonaiuto et al. | 224/930 X |
| 5,887,776 | 3/1999 | Munoz | 224/269 X |
| 5,893,497 | 4/1999 | Schaiewitz | 224/269 X |

*Primary Examiner*—Ramon O. Ramirez
*Attorney, Agent, or Firm*—Frank M. Scutch, III; Daniel K. Nichols

[57] ABSTRACT

A housing (101) for a portable two-way radio (100) includes a first aperture (107) located substantially at one end of the housing (101) for engaging an first attachment apparatus such as a belt clip (201). A second aperture (111) is located substantially at the opposite end of the radio housing (101) for engaging a second attachment apparatus. The first aperture (107) and the second aperture (111) are used with the belt clip (201) such that the clip may be secured within either the first aperture (107) or second aperture (111) for attachment to a user's body or other object. The attachment of the belt clip (201) is unique in that it can be bent without being disengaged from its associated aperture.

3 Claims, 3 Drawing Sheets

BELT CLIP APERTURE FOR USE IN A TWO-WAY RADIO HOUSING AND METHOD OF USING SAME

CROSS REFERENCE TO RELATED APPLICATIONS

This application is related to pending U.S. application Ser. No. 8/775,980, filed Jan. 3, 1997, by Tyneski, et al., entitled "Lanyard Fastening Apertures for Use in a Two Way Radio Housing and Method of Using Same," and assigned to Motorola, Inc.

TECHNICAL FIELD

This invention relates in general to two-way portable radios and more specifically to fastening a two-way portable radio to a user's body.

BACKGROUND

Many portable communications devices such as cellular telephones, pagers, and two-way radio equipment are commonly used by many people in their day-to-day activities. In to maintain constant communication capability, my people consider these devices almost indispensable and are carried on their person at all times.

One problem associated with carrying such devices, particularly two-way radio equipment, is that it is necessary to continually carry the two-way radio when the user is mobile and involved in some physical activity. Many times a purse or backpack is not available in order to store the device. Even if these were available, the radio can not be easily used while stored in this manner.

Moreover, it is difficult and burdensome to continually carry the radio in the user's hands since this does not leave the hands free and available for other tasks or activities. Although clips and straps are sometimes available to secure the radio to the user's body, these devices are uncomfortable to wear. Also, if the radio is frequently used or maintained in a standby mode, it will be necessary for the user to hear calls or sounds from the radio speaker. Therefore, storing the radio in an inconspicuous place would not lend itself to this purpose. Additionally, it would be helpful for the user to have alternative means to either carry of clip the radio to the user's body.

Accordingly, the need exists for an alternative method to carry a portable two-way radio so that it can be maintained in a standby state for easy access while being comfortable to wear.

DETAILED DESCRIPTION OF THE PREFERRED EMBODIMENT

Figure 1:
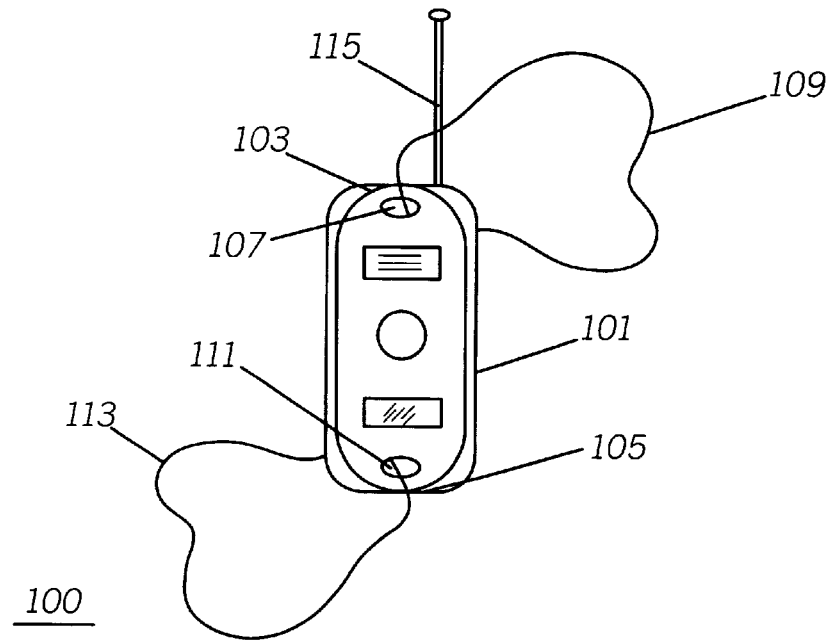
FIG. 1 shows a front view of a portable two-way radio including a plurality of apertures at both ends of the radio according to the preferred embodiment of the invention.

Referring now to FIG. 1, a portable-two way radio 100 includes a housing 101 (having opposed front and rear walls), having a first end 103 and second end 105. Although shown in an oval configuration, it would be evident to those skilled in the art that the shape of the housing may be circular or rectangular or any variation thereof.

At the first end 103 of the housing 101, a first lanyard aperture 107 is closed and extends completely through the body of the housing 101. A first hand or neck lanyard can then be attached or secured through the first lanyard aperture 107 for attachment to a user's body. Similarly, at the opposite or second end 105 of the housing 101, a second lanyard aperture 111 extends through the housing and can also be used to secure a second hand or neck lanyard 113. The second aperture 111 can be used in situations where the portable two-way radio 100 is to be held inverted i.e. up-side down from its normally used position. Although the first lanyard aperture 107 and second lanyard aperture 111 are shown in a oval configuration, it will be evident to a skilled artisan that circular, square or triangular shapes can be used.

Figure 2:
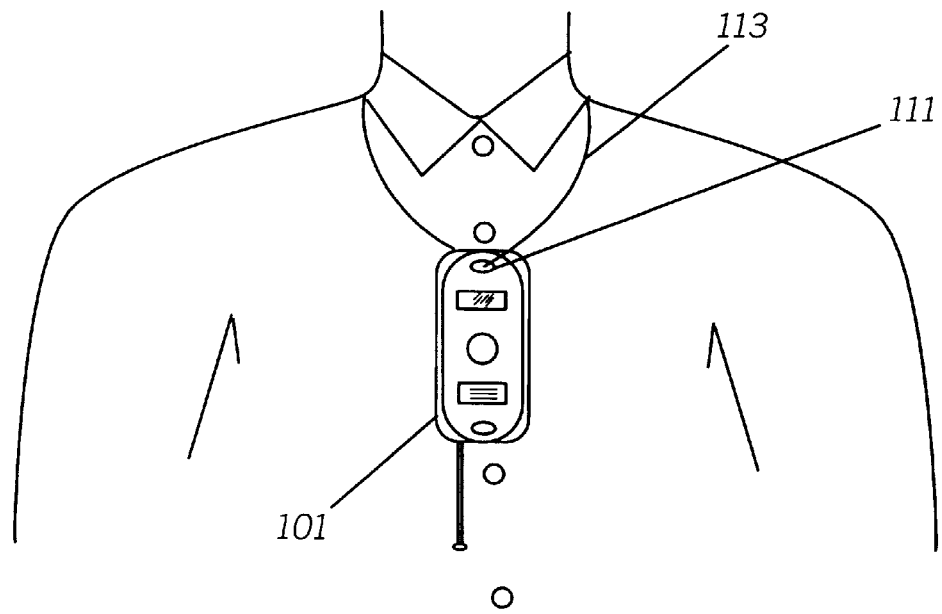
FIG. 2 shows a front view of a typical user with the two-way radio worn about the neck using a neck lanyard where the lanyard is secured through one of the lanyard apertures in accordance with the present invention.

Thus, the use of lanyard apertures would enable the user, to wear the portable two-way radio 100 in a variety of configurations depending comfort or the physical activity. For example, the radio could be worn close to the body at a low position with the radio antenna 115 extending upward toward the user's face or it could be worn in a higher position with the radio antenna extending in a downward manner using the second lanyard aperture. In FIG. 2, the portable two-way radio is shown held around a user's neck using the second lanyard aperture 111 and second lanyard 113.

Similarly, the method of using the present invention includes the steps of providing a first lanyard aperture at one end of a portable two-way radio housing. Then, providing a second lanyard aperture at the opposite end of the portable two-way radio housing where a lanyard is then attached to either the fist lanyard aperture or the second lanyard aperture for fastening the lanyard about a user's neck.

Figure 3:
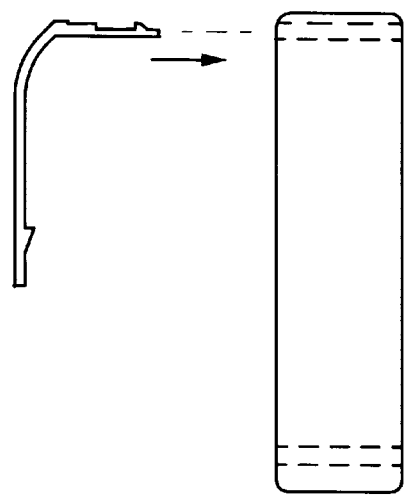
FIGS. 3–5 show an alternative embodiment where a belt clip is inserted into one of the lanyard apertures for an alternative attachment to the user's body.
Figure 4:
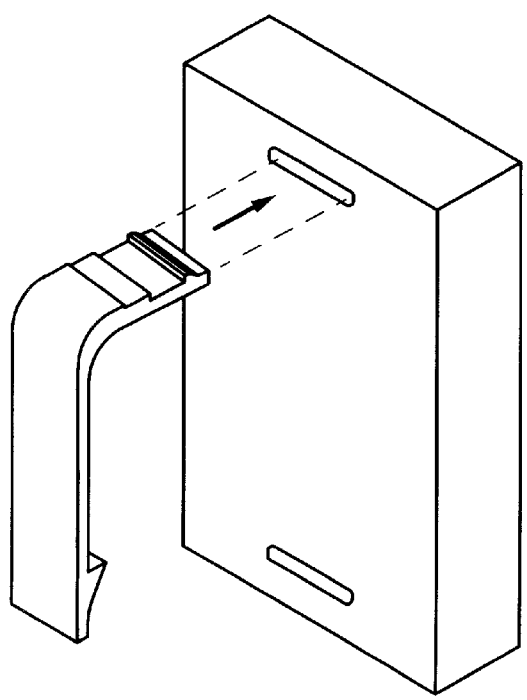

In a second embodiment of the invention, the first lanyard aperture 107 or the second lanyard aperture 111 can be used with an attachment apparatus such as a belt clip 201. As seen in FIGS. 3 and 4 the belt clip 201 is frictionally engaged within either of the first lanyard aperture 107 or the second lanyard aperture 111 such that the belt clip 201 is held into a rigid position by clamping an object between the housing 101 and the belt clip 201. Thus, the radio can then be clipped or attached to the user's clothing or other objects.

Figure 5:
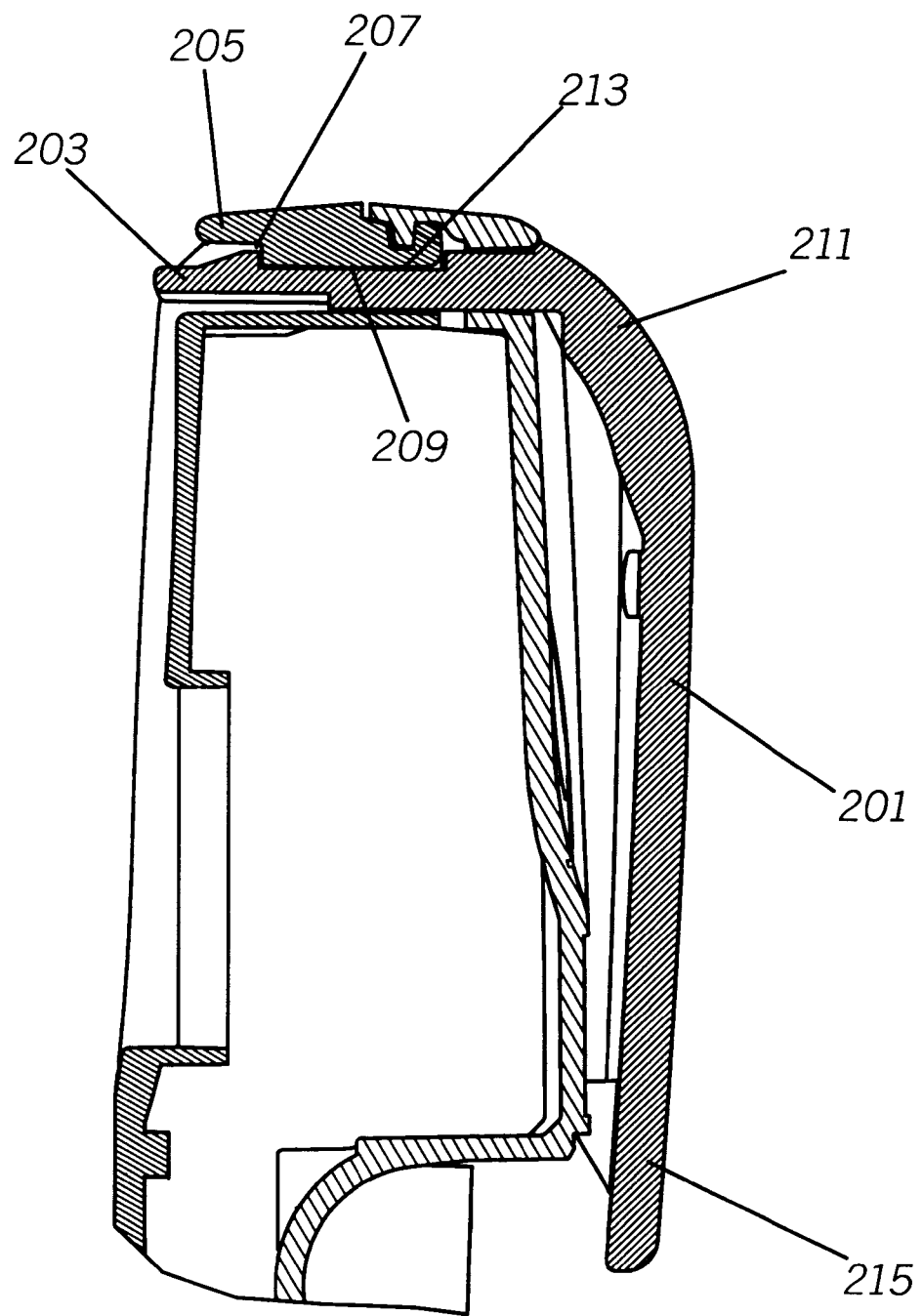

As shown in FIG. 5, the belt clip 201 is made of a pliable material such as a bendable plastic or the like. A cross-section thereof is seen frictionally engaged within the first lanyard aperture 107. The belt clip 201 includes a flange 203 having a beveled top 205 that mates or engages within an attachment slot 207 molded within the lanyard aperture. The belt clip 201 further includes a groove 209 located between the flange 203 and upper body 211 of the belt clip that engages with one or more tabs 213 that extend from an inner surface of the lanyard aperture.

When in use, the belt clip 201 is tightly engaged within the aperture without the use of extraneous components or hardware. It offers an advantage in that it can only be removed by a pulling force on the belt clip 201 from substantially behind the clip's location in the lanyard aperture. The pliability of the belt clip material allows the clip to be moved or bent at a location 215. This allows the belt clip 201 to be positioned on a user's body without the possibility of the clip being inadvertently disengaged from the housing 101.

While the preferred embodiments of the invention have been illustrated and described, it will be clear that the invention is not so limited. Various modifications, changes, variations, substitutions and equivalents will occur to those skilled in the art without departing from the spirit and scope of the present invention as defined by the appended claims.

What is claimed is:

1. A housing, having opposed front and rear walls having opposite ends, for a portable two-way radio comprising:

a first aperture located substantially at one end of the housing and extending completetely through the housing from the front wall to the rear wall;

a second aperture located substantially at the opposite end of the housing and extending completely through the housing from the front wall to the rear wall; and an attachment clip is fastened perpendicularly with respect to the housing rear wall within one of the first and second apertures.

2. A portable two-way radio having a main housing body with a first end and a second end and opposed front and rear walls comprising:

a first attachment aperture located at the first end of the main housing body and extending therethrough from the front wall to the rear wall;

a second attachment aperture located at the second end of the main housing body and extending therethrough from the front wall to the rear wall; and wherein at least one of the first and second attachment apertures has a narrow profile for frictionally engaging a clip selectively inserted perpendicularly with respect to the housing body rear wall through said at least one attachment aperture for attachment to a user's body.

3. A portable two-way radio housing as in claim 2 wherein the clip is pliable for conforming to an attachment surface.

* * * * *